July 14, 1936.                G. A. BARDET                2,047,250
KEY FOR TEARING STRIP CANS
Filed March 2, 1935
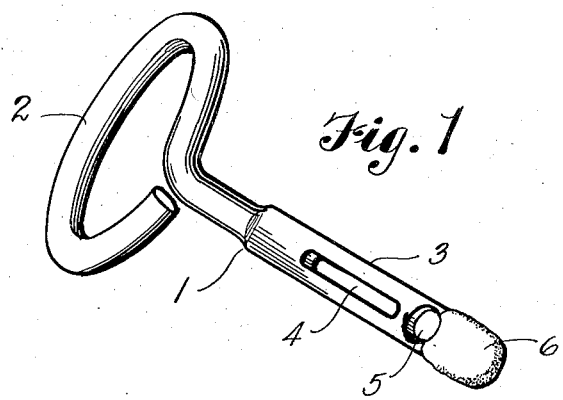
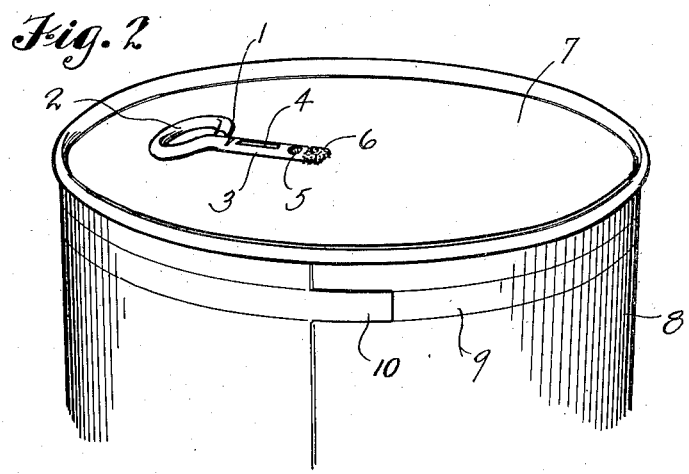
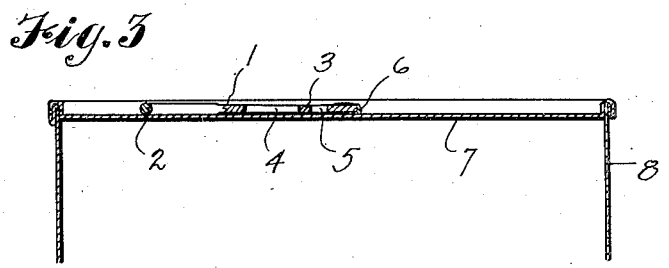
INVENTOR
GEO. A. BARDET
BY Cook & Robinson
ATTORNEY Patented July 14, 1936

2,047,250

UNITED STATES PATENT OFFICE 2,047,250

KEY FOR TEARING STRIP CANS

George A. Bardet, Berkeley, Calif., assignor to M. J. B. Company, a corporation of Delaware Application March 2, 1935, Serial No. 9,040

1 Claim. (Cl. 220—52)

This invention relates to improvements in keys for opening cans of that kind known in the can industry as "key opening cans", or "tearing strip cans", and which keys are characterized by having a shank portion that is slotted to receive the tongue end of the tearing strip of the can and about which shank the strip is wound in its removal from the can body.

It is very desirable that keys of this kind be individually attached to the cans so that when a can reaches the consumer, a key will be conveniently accessible for use. As a general rule the keys are attached to the can ends before the ends are secured on to the bodies, or at least before the cans are filled. Seldom are the keys attached to the cans after the cans have been packed and closed. It is especially desirable to attach the keys prior to filling the cans since most keys are attached by solder or by welding which requires an application of heat that would, in most instances, scorch or to some extent otherwise damage the can contents which happened to be in close contact with the heated area. When the keys are soldered to the can ends before the can contents is processed or cooked in the sealed can, it is necessary to attach them very securely in order to prevent their being detached in the cooker; it being understood that the heat to some extent weakens the soldered connection and also causes a certain outward bulging of the can ends whereby the keys are caused to be exposed and are caused to scrape against the cooker wall and if not securely attached will be scraped off. Therefore, it has been found necessary, when keys are attached by solder, to apply quite an appreciable amount for this purpose. The usual manner of preparing the keys for attachment is to first dip the ends of the key shanks in a suitable flux, then to dip the fluxed ends in molten solder so that the solder which clings to each individual key may subsequently be melted to solder the keys to a can.

In the past, difficulty in applying some keys to the tearing strip has been experienced due to the fact that the flux may be drawn by capillary attraction, or otherwise, along the key shank, and then when the fluxed end is dipped into the solder, its affinity for flux causes it to run along the key shank to the same extent and this sometimes results in filling the tearing strip slot making it difficult or impossible to apply the key to the tearing strip tongue.

In view of this above mentioned undesirable result, it has been the object of this invention to construct a key in a manner whereby the solder area is definitely limited, especially with respect to its overlapping or extending into the tearing strip slot.

More specifically stated, the invention resides in the provision of a relatively large opening in the shank of the key at a point between the slot and the solder bearing area of the key, thereby to overcome the possibility of the solder being drawn along the shank of the key or entering into the tearing strip slot.

In accomplishing the above objects of the invention, I have provided the improved details of construction, the preferred forms of which are illustrated in the accompanying drawing, wherein—

Fig. 1 is an enlarged, perspective view of a key constructed in accordance with the present invention.

Fig. 2 is a view illustrating the key as attached to a can end wall.

Fig. 3 is a sectional view of the can end with the key attached.

Referring more in detail to the drawing—

1 designates in its entirety a key constructed in accordance with the present invention and, as here illustrated, is made from a single piece of round wire that is bent to form a loop 2 forming the handle portion of the key, and from which extends a straight shank portion 3. The shank is somewhat flattened in the plane of the handle and is formed with a longitudinal slot 4 for reception of the tearing strip tongue, and directly below the slot is an opening 5 of substantial size which separates the end area of the key from the end of the key slot.

As illustrated best in Fig. 1, the opening 5 is circular and it is centrally located with respect to the opposite side edges of the key shank and is spaced somewhat from the lower end of the key so that the end portion may be tipped with a substantial amount of solder; the solder tip being indicated by reference numeral 6.

In Figs. 2 and 3, the key is illustrated as being attached to the end wall 7 of a can body 8. The body is equipped with a tearing strip 9 having a tongue 10 to which the key is to be applied for removal of the strip.

In order to attach the present key to a can, the lower end portion of the shank is first dipped in a suitable flux, then the end is dipped into molten solder. A certain amount of solder clings to the end of the key and hardens. Subsequently the key is pressed against the end wall of a can and heat is applied to the solder area, thereby causing the solder to melt and upon cooling to effect an attachment of the key to the can.

The particular advantage of the present invention resides in the fact that the opening 5 formed through the key shank just below the slot 4 is of ample size to practically separate the lower end portion of the key shank from the slotted portion. Thus, even though the flux might be drawn along the shank to the slotted area, the opening 5 will prevent the solder following to the extent of the flux for the reason that the tendency of the solder to fill the opening will be greater than the tendency to flow up the key shank.

When it is desired to use the key for removal of the tearing strip, the user grasps the handle portion 2 of the key and pulls away from the can end wall, thereby breaking the key loose from the can. The key is then applied to the tongue 10 and the strip is removed in the usual manner.

It has been satisfactorily demonstrated that the provision of the opening 5 overcomes the difficulties and objections heretofore experienced due to the flow of solder along the key shank and also, limits the amount of solder that is used.

While I have illustrated the key as being attached to the can end wall it is to be understood that it may be attached to the body wall or at any other location without departing from the spirit of the invention, also, the key might assume various forms other than that illustrated. The gist of the invention resides in the provision of an opening in the shank intermediate that portion that is to bear the solder and that containing the key slot to serve as a means of limiting the spread of the solder in the direction of the slot.

Having thus described my invention, what I claim as new therein and desire to secure by Letters Patent is—

A key of the character described having a solder bearing area and having a slot for reception of the end of a tearing strip and an opening intermediate the slot and solder bearing area for limiting the run of molten solder in the direction of the slot.

GEORGE A. BARDET.